United States Patent [19]

Bauer

[11] 4,182,565
[45] Jan. 8, 1980

[54] LIGHT-RAY DEVIATOR FOR CAMERA OBJECTIVE

[75] Inventor: Klaus Bauer, Bad Kreuznach, Fed. Rep. of Germany

[73] Assignee: Jos. Schneider & Co., Bad Kreuznach, Fed. Rep. of Germany

[21] Appl. No.: 902,161

[22] Filed: May 2, 1978

[30] Foreign Application Priority Data

May 17, 1977 [DE] Fed. Rep. of Germany ....... 2722787

[51] Int. Cl.$^2$ .......................... G02B 1/00; G02B 1/10; G03B 13/06
[52] U.S. Cl. .................................... 354/224; 354/225; 350/276 SL
[58] Field of Search ............... 354/224, 225, 201, 166, 354/154, 155, 296; 350/276 SL, 282

[56] References Cited

U.S. PATENT DOCUMENTS

| | | | |
|---|---|---|---|
| 3,181,445 | 5/1965 | Reymond | 354/225 |
| 3,650,606 | 3/1972 | Van Noord | 350/282 |

FOREIGN PATENT DOCUMENTS 2254446  5/1974  Fed. Rep. of Germany .......... 354/166

*Primary Examiner*—John Gonzales
*Assistant Examiner*—Shelley Wade
*Attorney, Agent, or Firm*—Karl F. Ross

[57] ABSTRACT

A viewfinder system of a photographic or cinematographic camera, provided with a varifocal objective, is illuminated by light deviators including a fully reflective mirror intercepting part of the light rays passing from the fourth to the final component of the objective. The mirror has a body of dark-stained glass, designed to prevent spurious reflections at the edges, and is coated on its front surface with a reflective layer produced by vapor deposition.

3 Claims, 1 Drawing Figure

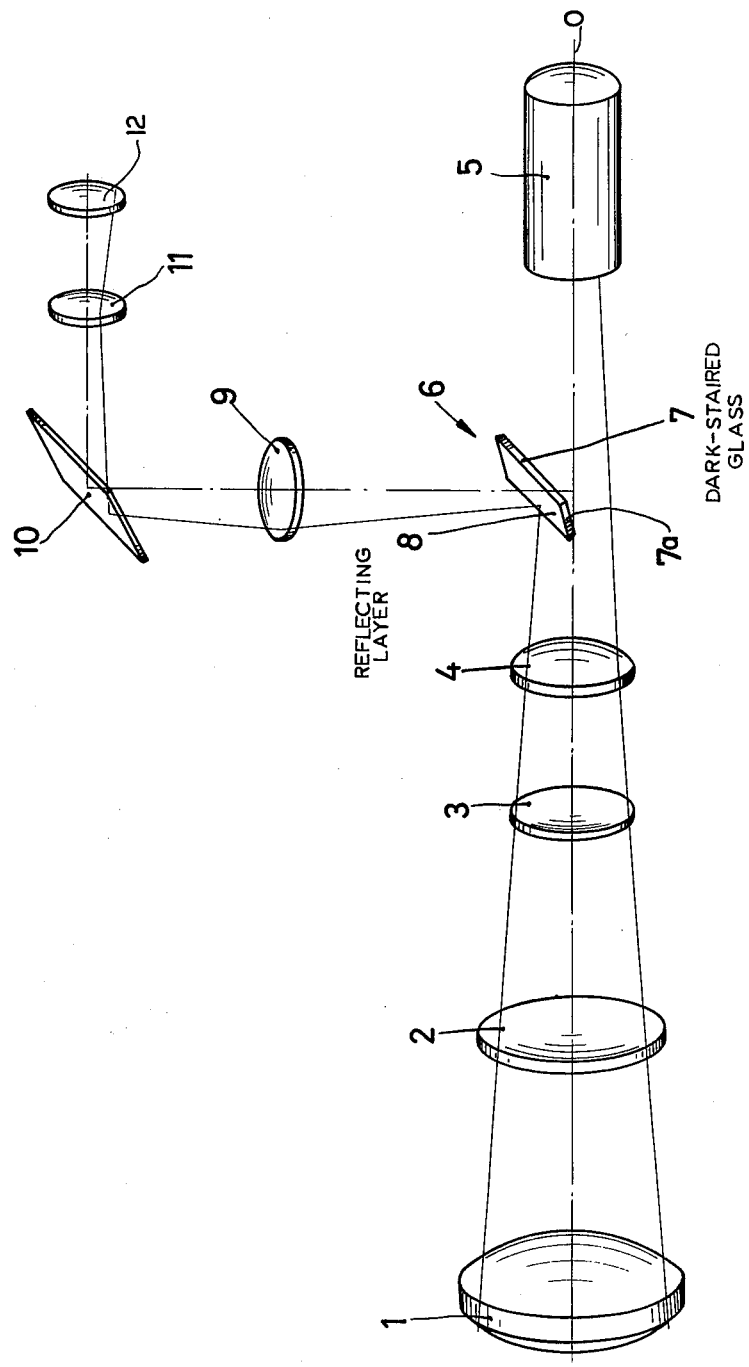

LIGHT-RAY DEVIATOR FOR CAMERA OBJECTIVE

FIELD OF THE INVENTION

My present invention relates to a photographic or cinematographic camera equipped with a viewfinder system of the type wherein some of the light rays traversing certain lens members of the main objective are deviated to an eyepiece of the finder.

BACKGROUND OF THE INVENTION

The deviation of some of the incident rays for viewfinding purposes can be carried out either by a semitransparent reflector intercepting the entire beam, as formed for example by a pair of cemented prisms, or by a small fully reflective mirror interposed in the path of only some of the rays. The latter solution is often preferred for economic reasons.

Conventional mirrors of the fully reflective type have lateral edges which, on being struck at a glancing angle by incident rays not directly intercepted, may give rise to objectionable reflections. To avoid this problem, it has been customary to blacken the mirror edges by coating them with a lacquer or the like.

OBJECT OF THE INVENTION

The object of my present invention is to provide an improved mirror for the purpose set forth which need not be subjected to such a blackening procedure.

SUMMARY OF THE INVENTION

I have found, in accordance with the present invention, that disturbing reflections from the lateral edges of an interposed mirror can be avoided if the body of that mirror is made of dark-stained glass. The front surface of this body, facing the incident rays, is covered by a fully reflective layer which may be applied thereto by vapor deposition, for example.

BRIEF DESCRIPTION OF THE DRAWING

The above and other features of the invention will now be described in detail with reference to the accompanying drawing the sole FIGURE of which diagrammatically shows a camera objective equipped with a viewfinder system according to my invention.

SPECIFIC DESCRIPTION

The objective shown in the drawing is of a conventional zoom type with a varifocal front group 1–4 and a fixed-focus rear or relay group 5 whose several lenses have not been illusrated individually. The varifocal group consists of a positive front component 1, two negative and axially shiftable intermediate components 2, 3 and a stationary positive component 4, all represented diagrammatically by single lenses. The optical axis of the objective has been indicated at 0.

In accordance with my invention, a part of the incoming beam is diverted in a direction generally perpendicular to axis 0 by a reflector 6 comprising a prismatic body 7 of dark-stained glass coated with a reflecting layer 8 on its forward surface confronting the incident rays. Mirror 6, which may be disposed just ahead of a nonillustrated iris diaphragm, is entirely located on one side of axis 0 so as to intercept only a fraction of the bundle of light rays originating at any point of an object to be photographed. The deflected rays pass through a finder objective 9 and are redirected into an axial position by another mirror 10 so as to traverse a pair of lenses 11, 12, the latter constituting the eyepiece of the finder. It will be noted than an edge 7a of mirror body 7 transverse to its reflecting front surface 8 is positioned to intercept some of the incident light rays. The dark color of the body and therefore of edge 7a prevents the latter from reflecting any of these intercepted light rays.

My improved reflector 6 can be produced at low cost without giving rise to objectionable reflection phenomena within the objective 1–5.

I claim:

1. In a camera provided with a multilens objective centered on an optical axis, a viewfinder eyepiece offset from said axis, and ray-deviating means for diverting to said eyepiece part of the light traversing said objective, the improvement wherein said ray-deviating means includes a fully reflecting mirror inserted between two lens members of said objective, said mirror having a body of nonreflective dark-stained glass covered with a reflective layer on a surface confronting the incident light rays, said body further having a lateral edge transverse to said surface positioned to intercept some of said light rays but prevented by the dark color of the body from reflecting the intercepted light rays.

2. The improvement defined in claim 1 wherein said mirror is entirely positioned on one side of said axis.

3. The improvement defined in claim 1 or 2 wherein said objective comprises a varifocal front group and a fixed-focus rear group, said mirror being disposed between said groups.

* * * * *